(12) United States Patent
Lee

(10) Patent No.: US 12,220,770 B2
(45) Date of Patent: Feb. 11, 2025

(54) PRE-STRESSED STEEL SHEET

(71) Applicant: POSCO, Pohang-si (KR)

(72) Inventor: Jae-Yik Lee, Pohang-si (KR)

(73) Assignee: POSCO, Pohang-si (KR)

( * ) Notice: Subject to any disclaimer, the term of this patent is extended or adjusted under 35 U.S.C. 154(b) by 36 days.

(21) Appl. No.: 17/783,709

(22) PCT Filed: Dec. 10, 2020

(86) PCT No.: PCT/KR2020/018088
§ 371 (c)(1),
(2) Date: Jun. 9, 2022

(87) PCT Pub. No.: WO2021/118274
PCT Pub. Date: Jun. 17, 2021

(65) Prior Publication Data
US 2023/0008459 A1    Jan. 12, 2023

(30) Foreign Application Priority Data
Dec. 11, 2019 (KR) .......................... 10-2019-0164279

(51) Int. Cl.
*B32B 3/00* (2006.01)
*B21D 1/00* (2006.01)
(Continued)

(52) U.S. Cl.
CPC .............. *B23K 33/002* (2013.01); *B21D 1/00* (2013.01); *B21D 1/02* (2013.01); *B23K 9/042* (2013.01);
(Continued)

(58) Field of Classification Search
CPC .. B23K 2103/04; B23K 31/003; B23K 9/042; B23K 33/002; B23K 26/0093;
(Continued)

(56) References Cited

U.S. PATENT DOCUMENTS

| 4,645,720 A | 2/1987 | Pircher et al. |
| 2007/0214998 A1 | 9/2007 | Komaki et al. |

(Continued)

FOREIGN PATENT DOCUMENTS

| CN | 1163163 A | 10/1997 |
| CN | 102390011 A | 3/2012 |

(Continued)

OTHER PUBLICATIONS

R. Oyyaravelu, et al., "Metallurgical and mechanical properties of laser welded high strength low alloy steel," in J. Adv. Res. (2016), pp. 463-472 (Mar. 2016). (Year: 2016).*

(Continued)

*Primary Examiner* — Michael E. La Villa
(74) *Attorney, Agent, or Firm* — Morgan, Lewis & Bockius LLP

(57) ABSTRACT

The present disclosure provides a pre-stressed steel sheet comprising: a base material; and a plurality of weld lines formed on the base materials, wherein the average spacing between each pair of the weld lines is equal to or greater than five times the width of the weld lines and equal to or less than half the width of the steel sheet.

10 Claims, 3 Drawing Sheets

(51) Int. Cl.
| | |
|---|---|
| *B21D 1/02* | (2006.01) |
| *B23K 9/04* | (2006.01) |
| *B23K 9/235* | (2006.01) |
| *B23K 26/00* | (2014.01) |
| *B23K 26/34* | (2014.01) |
| *B23K 26/60* | (2014.01) |
| *B23K 31/00* | (2006.01) |
| *B23K 33/00* | (2006.01) |
| *B32B 3/02* | (2006.01) |
| *B32B 3/08* | (2006.01) |
| *B32B 3/10* | (2006.01) |
| *B32B 3/14* | (2006.01) |
| *B32B 3/26* | (2006.01) |
| *B32B 3/30* | (2006.01) |
| *B32B 15/01* | (2006.01) |
| *B32B 15/04* | (2006.01) |
| *B32B 15/18* | (2006.01) |
| *B23K 101/18* | (2006.01) |
| *B23K 101/28* | (2006.01) |
| *B23K 103/04* | (2006.01) |

(52) U.S. Cl.
CPC .......... *B23K 9/235* (2013.01); *B23K 26/0093* (2013.01); *B23K 26/34* (2013.01); *B23K 26/60* (2015.10); *B23K 31/003* (2013.01); *B32B 3/00* (2013.01); *B32B 3/02* (2013.01); *B32B 3/08* (2013.01); *B32B 3/10* (2013.01); *B32B 3/14* (2013.01); *B32B 3/26* (2013.01); *B32B 3/263* (2013.01); *B32B 3/30* (2013.01); *B32B 15/01* (2013.01); *B32B 15/011* (2013.01); *B32B 15/012* (2013.01); *B32B 15/013* (2013.01); *B32B 15/04* (2013.01); *B32B 15/18* (2013.01); *B23K 2101/18* (2018.08); *B23K 2101/28* (2018.08); *B23K 2103/04* (2018.08); *Y10T 428/12306* (2015.01); *Y10T 428/12319* (2015.01); *Y10T 428/12389* (2015.01); *Y10T 428/12396* (2015.01); *Y10T 428/12854* (2015.01); *Y10T 428/12951* (2015.01); *Y10T 428/12958* (2015.01); *Y10T 428/12965* (2015.01); *Y10T 428/12972* (2015.01); *Y10T 428/12979* (2015.01); *Y10T 428/12993* (2015.01); *Y10T 428/24942* (2015.01); *Y10T 428/2495* (2015.01); *Y10T 428/24967* (2015.01); *Y10T 428/26* (2015.01)

(58) Field of Classification Search
CPC .... B23K 26/34; B23K 26/60; B23K 2101/18; B23K 2101/28; B21D 1/02; B21D 1/00; B32B 3/00; B32B 3/02; B32B 3/08; B32B 3/10; B32B 3/14; B32B 3/26; B32B 3/263; B32B 3/30; B32B 15/01; B32B 15/012; B32B 15/013; B32B 15/04; B32B 15/18; B32B 15/011; Y10T 428/12306; Y10T 428/12319; Y10T 428/12389; Y10T 428/12854; Y10T 428/24967; Y10T 428/24942; Y10T 428/2495; Y10T 428/26; Y10T 428/12396; Y10T 428/12951; Y10T 428/12958; Y10T 428/12965; Y10T 428/12972; Y10T 428/12979; Y10T 428/12993

See application file for complete search history.

(56) References Cited

U.S. PATENT DOCUMENTS

| | | |
|---|---|---|
| 2012/0305122 A1 | 12/2012 | Ishikawa et al. |
| 2013/0168371 A1 | 7/2013 | Furusako et al. |

FOREIGN PATENT DOCUMENTS

| | | | |
|---|---|---|---|
| CN | 102398145 | A | 4/2012 |
| CN | 102500900 | A | 6/2012 |
| CN | 102666899 | A | 9/2012 |
| CN | 103153523 | A | 6/2013 |
| CN | 206163502 | U | 5/2017 |
| CN | 107175421 | A | 9/2017 |
| DE | 102015103366 | A1 | 9/2016 |
| JP | S62-88521 | A | 4/1987 |
| JP | H02-104472 | A | 4/1990 |
| JP | 2004-232376 | A | 8/2004 |
| JP | 2011-131260 | A | 7/2011 |
| JP | 2012-240086 | A | 12/2012 |
| JP | 2018-30143 | A | 3/2018 |
| JP | 2019-181486 | A | 10/2019 |
| KR | 10-1985-0004125 | A | 7/1985 |
| KR | 10-0473454 | B1 | 3/2005 |
| KR | 10-2008-0072937 | A | 8/2008 |
| KR | 10-1096991 | B1 | 12/2011 |
| KR | 10-1625378 | B1 | 5/2016 |
| KR | 10-1798416 | B1 | 11/2017 |
| KR | 10-1801809 | B1 | 12/2017 |
| KR | 10-1913069 | B1 | 10/2018 |
| KR | 10-1957337 | B1 | 3/2019 |
| KR | 20-2019-0001799 | U | 7/2019 |

OTHER PUBLICATIONS

Communication issued Jun. 27, 2023 for corresponding Japanese Patent Application No. 2022-535132.
Extended European Search Report dated Dec. 20, 2022 issued in European Patent Application No. 20898262.9.
International Search Report dated Mar. 2, 2021 issued in Intetional Patent Application No. PCT/KR2020/018088 (with English translation).
Office Action issued Oct. 27, 2023 for counterpart Chinese Patent Application No. 202080081416.4.
Office Action issued Nov. 28, 2023 for counterpart Japanese Patent Application No. 2022-535132.

\* cited by examiner

[FIG. 1]
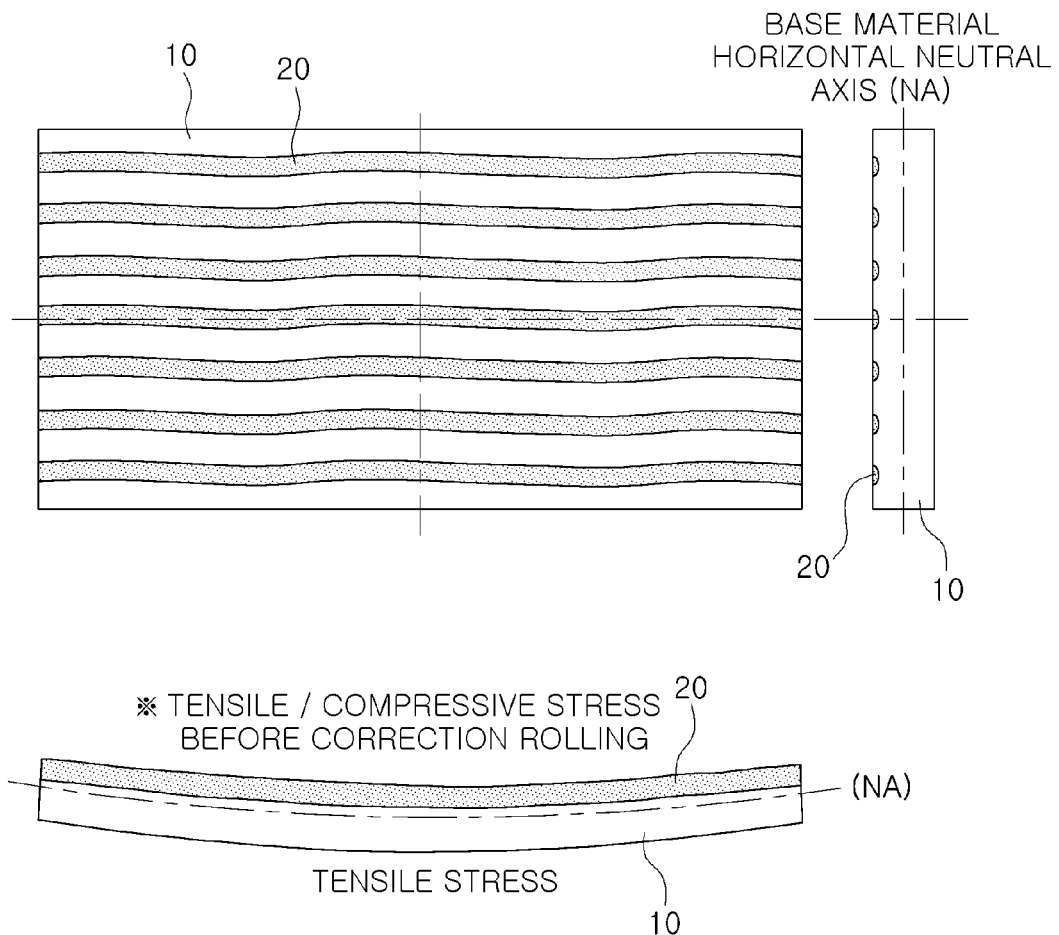

[FIG. 2]
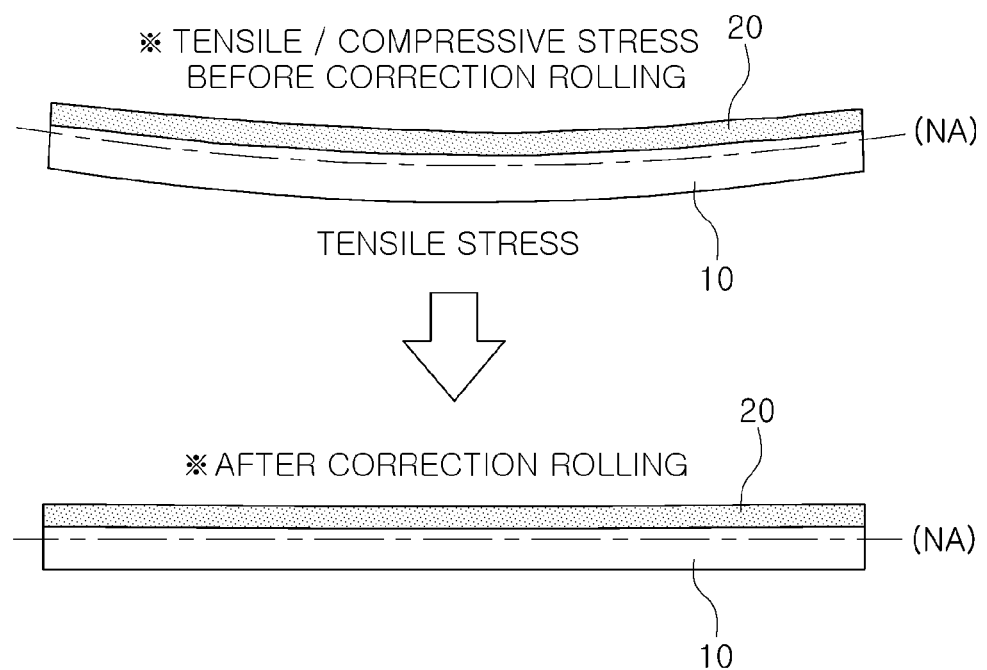

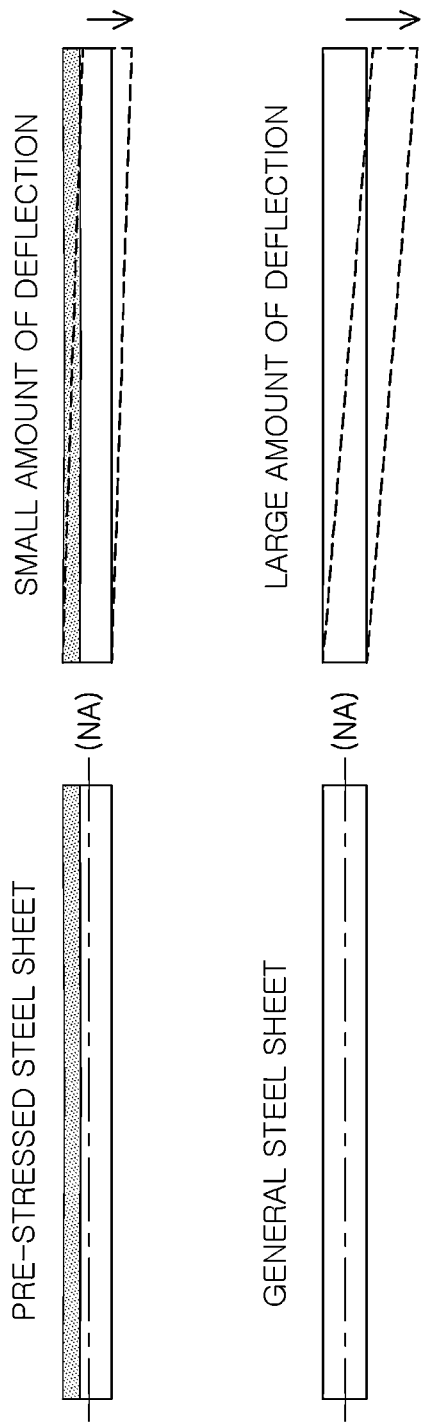
[FIG. 3]

PRE-STRESSED STEEL SHEET

CROSS-REFERENCE OF RELATED APPLICATIONS

This application is the U.S. National Phase under 35 U.S.C. § 371 of International Patent Application No. PCT/KR2020/018088, filed on Dec. 10, 2020, which in turn claims the benefit of Korean Application No. 10-2019-0164279, filed on Dec. 11, 2019, the entire disclosures of which applications are incorporated by reference herein.

TECHNICAL FIELD

The present disclosure relates to a pre-stressed steel sheet and method of manufacturing the same.

BACKGROUND ART

With the development of high-strength materials, the use of thin materials for members having reduced thicknesses is increasing. However, a welded member using a thin material may have a large amount of welding deformation, which has to be corrected through post-processing, and secondary geometrical discontinuity may occur during calibration. As a result, there may be a problem of lowering structural performance such as bending performance of the member.

In this situation, by providing the steel with higher strength and compression stress distribution in the upper or lower direction, that is, in one direction, based on the horizontal neutral axis in the thickness direction, the welding deformation problem is solved, and techniques to increase load resistance have been proposed so as to satisfy the improvement of bending performance required in the manufacturing of structures such as cantilever beams or girders of both ends support beams.

Technology having this technological concept is already being applied a method providing tensile force known as pre-stress to a reinforced concrete structure using a stranded wire, but there are not many cases in which the technology is applied to a steel material such as a thick plate or a thin plate.

However, as an example, there is provided Patent Document 1, which relates to a technique for applying compressive stress by bonding steel to a high-strength steel beam. However, the technique disclosed in Patent Document 1 has the disadvantage of increasing the thickness of the structure as well as increasing costs through the use of additional steel.

Accordingly, there is a demand for the development of steel materials that can solve these problems while also solving the problem of welding deformation and improving bending performance.

RELATED ART DOCUMENT (Patent Document 1) Korean Patent Registration No. 0473454

DISCLOSURE

Technical Problem

An aspect of the present disclosure is to provide a pre-stressed steel sheet and a method of manufacturing the same.

Technical Solution

According to an aspect of the present disclosure, a pre-stressed steel sheet, comprising: a base material; and a plurality of weld lines formed on the base material, wherein an average spacing between a weld line and an adjacent weld line among the plurality of weld lines is equal to or greater than five times a width of the weld lines and equal to or less than ½ times a width of the steel sheet.

According to another aspect of the present disclosure, A method of manufacturing a pre-stressed steel sheet comprises: machining a groove in an area in which a weld line will be formed on a base material; forming the weld line on the groove in the base material; and correction rolling the base material on which the weld line is formed, wherein an average spacing between a weld line and an adjacent weld line among the plurality of weld lines is equal to or greater than five times a width of the weld lines and equal to or less than ½ times a width of the steel sheet.

Advantageous Effects

According to an aspect of the present disclosure, a pre-stressed steel sheet having improved bendability can be provided, and accordingly when the pre-stressed steel sheet is applied to a structural member such as a girder or beam, the bendability of a structure can be improved.

DESCRIPTION OF DRAWINGS

FIG. 1 a schematic diagram of a pre-stressed steel sheet according to an embodiment of the present disclosure.

FIG. 2 is a schematic diagram for comparing the amount of deflection between a pre-stressed steel sheet according to an embodiment of the present disclosure and a general steel sheet, when a load is applied.

FIG. 3 is a schematic diagram illustrating a state before and after correction rolling of a base material having a weld line formed thereon according to an embodiment of the present disclosure.

BEST MODE FOR INVENTION

FIG. 1 a schematic diagram of a pre-stressed steel sheet according to an embodiment of the present disclosure. Hereinafter, a pre-stressed steel sheet according to an embodiment of the present disclosure will be described with reference to FIG. 1.

A pre-stressed steel sheet according to an embodiment of the present disclosure is characterized in that it has a base material 10 and a plurality of weld lines 20 formed on the base material 10. At this time, it is preferable that the weld line has higher strength than the base material. Through this, as shown in FIG. 1, a compressive residual stress corresponding to the tensile residual stress generated by the contraction of the weld material is applied to the base material and at the same time, by increasing the strength of the steel sheet itself, it is possible to improve the deformation resistance against loads such as welding deformation and deflection of the steel sheet.

In the present disclosure, the type of the base material is not particularly limited, and all weldable steel materials applied to structure, etc. in the art can be used, for example, general structural steel, carbon steel for classification, SUS for classification, carbon steel for building structure and carbon steel for Built-UP H-beam, etc. can be used.

In the present disclosure, the thickness of the base material is not particularly limited, but, for example, the base material may have a thickness of 6 to 60 mm. When the thickness of the base material is less than 6 mm, welding deformation may occur greatly during welding, and all stress may be lost during deformation correction through roller correction after welding. On the other hand, if it exceeds 60 mm, the possibility of cracks may occur during the process increases due to the number of welding times and the restraint of the base material. Therefore, it is preferable that the thickness of the base material has a range of 6 to 60 mm. The lower limit of the thickness of the base material is more preferably 8 mm, even more preferably 10 mm, most preferably 12 mm. The upper limit of the thickness of the base material is more preferably 40 mm, more preferably 30 mm, most preferably 25 mm.

An average spacing between a weld line and an adjacent weld line among the plurality of weld lines is equal to or greater than five times a width of the weld lines and equal to or less than ½ times a width of the steel sheet. If the above conditions are not satisfied, the residual compressive stress caused by the weld lines may not be sufficiently applied to the base material, and thus the possibility that the deflection resistance of the steel sheet may be lowered may increase.

It is preferable that the number of weld lines is 2×(L/W) or more. Here, L is the length of the steel sheet and W is the width of the steel sheet. When the number of weld lines is less than 2×(L/W), the residual compressive stress caused by the weld lines may not be sufficiently applied to the base material, and thus the possibility that the deflection resistance of the steel sheet may be lowered may increase. In addition, in order to reduce mechanical properties deviation in the width direction, the weld line is preferably formed so as to be bilateral symmetry based on the width of the steel sheet. For example, if the number of weld lines is an even number, it is preferable to make it bilateral symmetrical about the center of the steel sheet based on the width direction of the steel sheet. If the number of the weld lines is an odd number, it is preferable to make it bilateral symmetrical based on the weld line, after the weld line is formed in the center based on the width direction of the steel sheet.

Preferably, the weld line has a thickness of up to ¼ t from the surface of the base material. In this case, t is the thickness of the steel sheet. In this way, by securing the thickness of the weld line at a certain level, it is possible to improve the strength of the steel sheet and suppress the sagging of the steel sheet. When the thickness of the weld line exceeds ¼ t from the surface of the base material, the temperature gradient in the thickness direction becomes small, which can reduce the generation of residual stress. If the penetration depth is increased, the welding deformation may be larger, and a large cost may be incurred to correct the welding deformation in the thick plate by rolling.

In the present disclosure, the shape of the weld line is not particularly limited, and for example, it may have a straight shape, a curved shape or a winding shape.

FIG. 2 is a schematic diagram for comparing the amount of deflection between a pre-stressed steel sheet according to an embodiment of the present disclosure and a general steel sheet, when a load is applied. As shown in FIG. 2, the pre-stressed steel sheet of the present disclosure not only reduces welding deformation as compared to a general steel sheet, but also improves bending performance, so that the amount of deflection when a load is applied can be reduced. Thereby, the pre-stressed steel sheet of the present disclosure can be preferably applied to structural members such as girders and beams etc. that require excellent bending.

Hereinafter, a method of manufacturing a pre-stressed steel sheet according to an embodiment of the present disclosure will be described.

First, a groove is machined in an area in which a weld line will be formed on a base material. The grooving may use various methods, for example, a method of rolling using a roll having projections formed thereon may be used. In the case of rolling using the roll having projections formed thereon, there is an advantage that a continuous process is possible. Meanwhile, in the present disclosure, the shape of the groove is not particularly limited, and the groove may only have a weldable shape so that a weld line can be formed.

Then, the weld line is formed on the groove in the base material. In the present disclosure, the welding method for forming the weld line is not particularly limited, and, for example, any one of SAW, FCAW, MAG welding, TIG welding, and laser welding may be used. In this case, when using a method such as SAW, FCAW, or MAG welding that can use a welding material, the welding material may have the form of a round bar or wire, or may have a strip shape. In addition, the welding may be performed through one pass or multiple passes, or by a method of parallel welding with a plurality of welding materials.

When forming the weld line, it is preferable that a bead height of the weld line be 1 to 2 mm. If the bead height of the weld line is less than 1 mm, there is a possibility that welding defects such as underfill may occur, and if the bead height of the weld line exceeds 2 mm, there is a possibility that a fracture by fatigue crack due to stress concentration may occur.

On the other hand, after forming the weld line, in order to remove the weld bead, polishing the surface of the steel sheet may be further included.

Thereafter, the base material on which the weld line is formed is correction rolled. FIG. 3 is a schematic diagram illustrating a state before and after correction rolling of a base material having a weld line formed thereon according to an embodiment of the present disclosure. As shown in FIG. 3, before correction rolling, both ends of the base material on which the weld line is formed are bent in the direction in which the weld line is formed due to compressive stress. Accordingly, in the present disclosure, the flatness of the steel sheet can be improved by correcting the warpage thereof through correction rolling. At this time, the correction rolling is preferably performed to the extent that the shape of the steel sheet is flattened, rather than applying a reduction force. If rolling force is applied, the compressive stress applied to the steel sheet may be reduced, and thus the effect to be obtained by the present disclosure may be reduced.

EXPLANATION OF SYMBOLS

10: Base Material
20: Weld Lines

The invention claimed is:

1. A pre-stressed steel sheet, comprising:
a base material; and
a plurality of weld lines formed on the base material,
wherein an average spacing between a weld line and an adjacent weld line among the plurality of weld lines is equal to or greater than five times a width of the weld lines and equal to or less than ½ times a width of the steel sheet, and wherein a number of the plurality of weld lines is 2×(L/W) or more,
where L is a length of the steel sheet and W is the width of the steel sheet.

2. The pre-stressed steel sheet according to claim 1, wherein the plurality of weld lines have higher strength than the base material.

3. The pre-stressed steel sheet according to claim 1, wherein the base material has a thickness of 6 to 60 mm.

4. The pre-stressed steel sheet according to claim 1, wherein the plurality of weld lines have a thickness of up to ¼ t from the surface of the base material, where t is a thickness of the steel sheet.

5. The pre-stressed steel sheet according to claim 1, wherein the plurality of weld lines have a straight shape, a curved shape or a winding shape.

6. The pre-stressed steel sheet according to claim 1, wherein the base material has a thickness of 8 to 40 mm.

7. The pre-stressed steel sheet according to claim 1, wherein the base material has a thickness of 10 to 30 mm.

8. The pre-stressed steel sheet according to claim 1, wherein the base material has a thickness of 12 to 25 mm.

9. The pre-stressed steel sheet according to claim 1, wherein the plurality of weld lines have a curved shape.

10. The pre-stressed steel sheet according to claim 1, wherein the plurality of weld lines have a winding shape.

\* \* \* \* \*